W. H. THOMA.
STRAINER.
APPLICATION FILED APR. 19, 1912.

1,046,679.

Patented Dec. 10, 1912.
2 SHEETS—SHEET 1.

WITNESSES

INVENTOR
William H. Thoma
by W. G. Doolittle
Attorney.

W. H. THOMA.
STRAINER.
APPLICATION FILED APR. 19, 1912.
1,046,679.
Patented Dec. 10, 1912
2 SHEETS—SHEET 2.
FIG. 5. FIG. 4. FIG. 6.
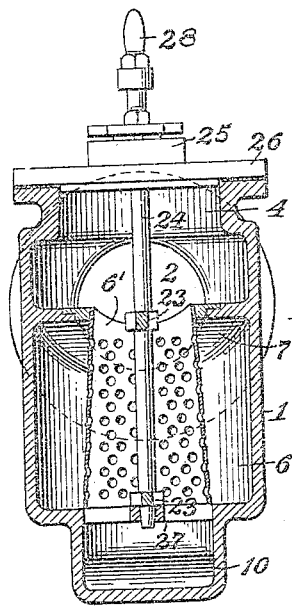
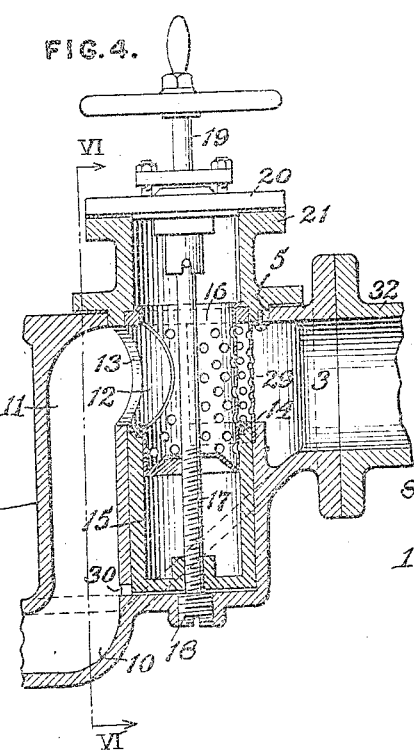
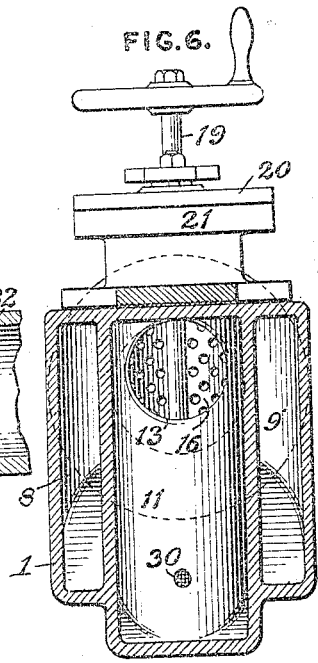
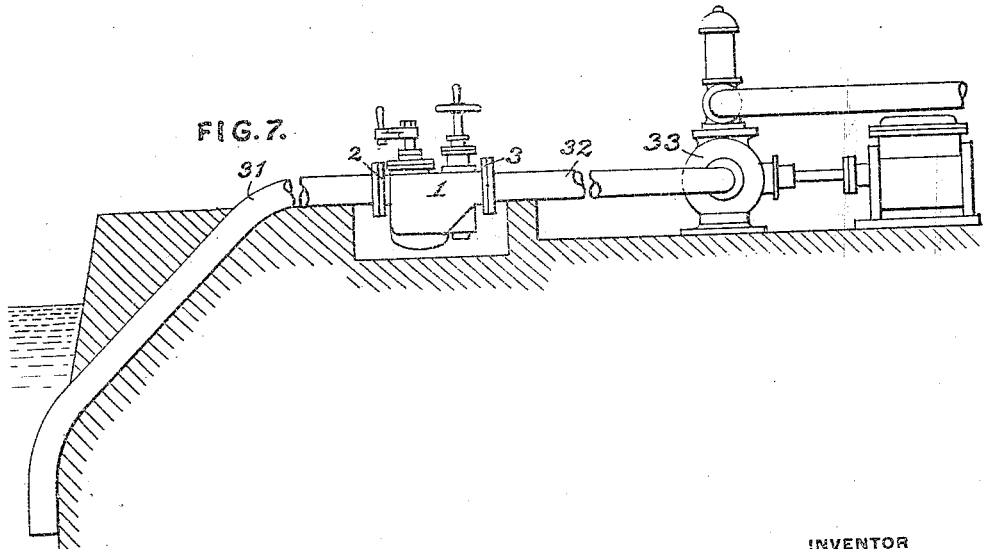
FIG. 7.
WITNESSES
INVENTOR
William H. Thoma
by W. G. Doolittle
Attorney.

UNITED STATES PATENT OFFICE.

WILLIAM H. THOMA, OF PITTSBURGH, PENNSYLVANIA.

STRAINER.

1,046,679.

Specification of Letters Patent.　Patented Dec. 10, 1912.

Application filed April 19, 1912.　Serial No. 691,823.

*To all whom it may concern:*

Be it known that I, WILLIAM H. THOMA, of Pittsburgh, in the county of Allegheny and State of Pennsylvania, have invented certain new and useful Improvements in Strainers, of which the following is a specification.

An object of my invention is to provide a new and improved apparatus for straining or filtering water embodying means whereby the flow or passage of water through the strainer from a raceway or other source of water supply, to a pump, for example, may continue uninterrupted during the act of removing the refuse or foreign matter caught by the strainer element.

A further object of the present invention is the provision of a strainer of the class mentioned having a chamber adapted to receive the foreign matter caught by the strainer element, and means operable to effect an automatic discharge of the refuse from said chamber by the water-supply.

Strainers of the class to which the present invention particularly relates are primarily designed for use in connection with a source of water supply not under pressure and in connection with a pump adapted to suck or draw the water through the strainer located between the water supply and the pump; but my invention is equally applicable where the water is conveyed under pressure as well as on suction lines having a vacuum.

Figure 1:
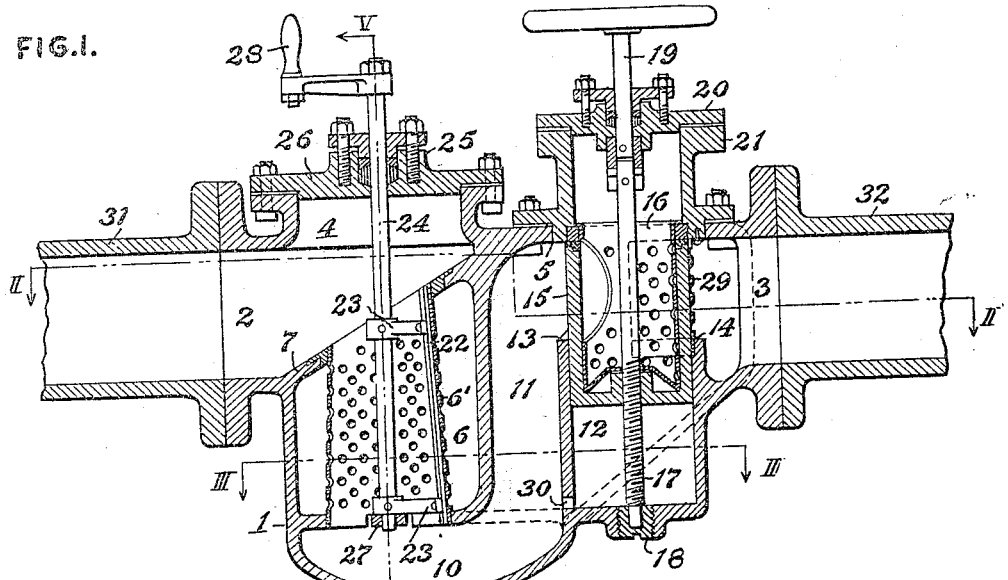
Figure 2:
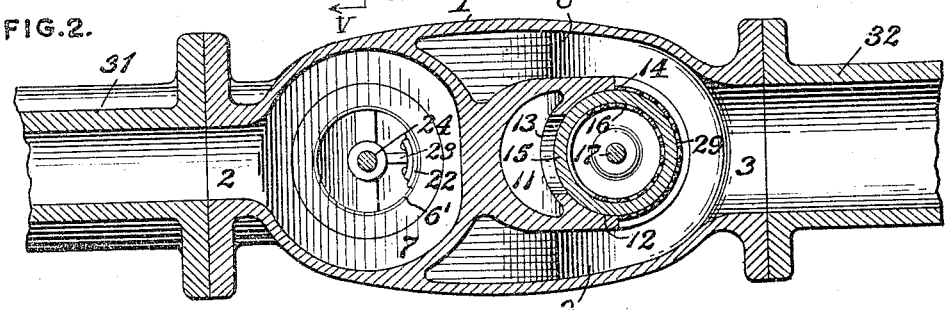
Figure 3:
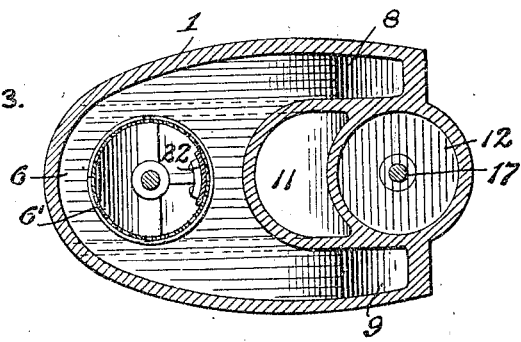

In the accompanying drawings, which illustrates an application of my invention, Figure 1 is a vertical longitudinal sectional view of a strainer embodying my invention; Fig. 2, a horizontal sectional view taken on line II—II of Fig. 1; Fig. 3, a horizontal sectional view taken on line III—III of Fig. 1; Fig. 4, a detail vertical sectional view particularly showing the outlet end of the strainer; Fig. 5, a vertical sectional view taken on line V—V of Fig. 1; Fig. 6, a vertical sectional view taken on line VI—VI of Fig. 4 looking in the direction of the arrows; and Fig. 7, a diagrammatic view showing a pump and illustrating an application of my invention in connection with a suction line.

Referring to the drawings, 1 designates the strainer casing or body preferably made from a single casting and formed with an inlet connection or passage 2, and an outlet or passage 3.

4 and 5 designate openings formed in the top of the casing. The interior of the casing is divided by partitions to form a straining chamber 6 having an inclined top wall 7, said chamber 6 being adapted to receive a straining element 6′ secured within said chamber.

The straining chamber 6 is in communication with the outlet 3 through the passages 8 and 9. The flow of water entering the inlet 2 passes down through an opening in the inclined wall into the strainer element 6′ and through said element into the straining chamber 6 from whence it flows to the outlet 3 through passages 8 and 9. The foreign matter or refuse carried into the strainer element is caught thereby and falls into a refuse chamber 10 located below the filtering chamber.

Interposed between the refuse chamber 10 or a passage 11 in communication therewith and constituting a part of the chamber designed to catch and retain the refuse, and the outlet 3, I provide a chamber 12, hereinafter referred to as the cleaning chamber. This cleaning chamber is preferably circular in cross section and its wall is provided with opposed openings 13 and 14 respectively providing communication between the passage 11 and the outlet 3.

Located within cleaning chamber 12 and operable to open and close communication between the refuse chamber and the outlet, is a valve device 15, and a removable perforated cleaning basket or cage 16. Valve 15 is moved to open and closed positions by means of a screw threaded operating stem 17 extending through chamber 12 and having its lower end entered in a socket 18 located in a wall of the chamber. The upper end of the stem 17 is connected with a stem 19 projecting through a stuffing box carried on a lid 20 of a removable closure element or cover 21.

The position of the valve 15 as shown by Fig. 1 cuts off communication between the refuse chamber 10 and the outlet, and in the position shown by Fig. 4, communication between the refuse chamber and the outlet is effected. When in the open position last mentioned, the action of the pump sucks or draws the refuse from chamber 10 and its communicating passage 11 into the basket 16, after which said basket must be lifted out of the strainer, after the removal of the closure 21, through the opening 5.

It will be understood that valve 15 is normally in the position shown by Fig. 1, but that when it is desired to clean the strainer, said valve 15 is moved into the position shown by Fig. 4, and the suction action of the pump is utlized to discharge the refuse from the refuse chamber. From the construction illustrated, it will be seen that the removal of the refuse from said chamber 10 into the removable basket 16 may be effected without stopping the flow of water through the strainer, so that the strainer at all times provides for a continuous and uninterrupted flow of water therethrough.

The strainer element 6', as illustrated, is supported by the inclined wall 7, and comprises a slightly tapering perforated cylindrical member open at both ends. In order to prevent the perforations from becoming clogged, I provide a scraper 22 supported by rods 23 secured to a shaft 24 which extends through a stuffing-box 25 carried on a cover 26 designed to close the opening 4 of the strainer casing. The lower end of shaft 24 is supported in a socket 27 and its upper end is provided with a handle 28.

It may be desirable in some instances to provide a screen 29 over the opening 14 and to form a small port 30 in the wall of the cleaning chamber. It is obvious that in the form of valve and cleaning basket illustrated the interior diameter of the valve is slightly greater than the diameter of the basket and that the valve is designed to surround the basket when in its closed position, but I do not limit myself to this construction.

By the diagrammatic view, I have shown the manner in which strainers of the class to which my invention relates are usually employed, i. e., a suction line, and in this view, 31 designates a pipe leading to the water supply and 32 a pipe leading from the strainer to a pump 33.

What I claim is:—

1. In a strainer, a casing having inlet and outlet passages, a straining chamber with a straining element therein, a refuse chamber, a cleaning chamber between the refuse chamber and the outlet passage, and means operable in one position to effect an automatic discharge of refuse from the refuse chamber to the cleaning chamber.

2. In a strainer, a casing having inlet and outlet passages, a strainer chamber with a straining element therein, a refuse chamber, a cleaning chamber between the refuse chamber and the outlet passage, a removable basket in the cleaning chamber, and a valve operable in one position to effect an automatic discharge of refuse from the refuse chamber to the cleaning chamber.

3. In a strainer, a casing having inlet and outlet passages, a strainer element, a refuse chamber, a valve interposed between the outlet passage and the refuse chamber operable to open and close communication between the refuse chamber and the outlet passage.

4. Means for straining water, etc., the combination with a pump, a strainer, a pipe leading to the strainer, said strainer having inlet and outlet passages, a strainer element, a refuse chamber, and means between the refuse chamber and the pump operative when moved in one position to effect communication between the refuse chamber and the outlet for discharging refuse by the suction of the pump from the refuse chamber.

In testimony whereof I affix my signature in presence of two witnesses.

WILLIAM H. THOMA.

Witnesses:
R. SHAFTER,
F. E. GAITHER.